US008909168B2

(12) United States Patent
Kondo

(10) Patent No.: US 8,909,168 B2
(45) Date of Patent: Dec. 9, 2014

(54) INTEGRATED CIRCUIT AND WIRELESS COMMUNICATION APPARATUS

(71) Applicant: Fumitaka Kondo, Kanagawa (JP)

(72) Inventor: Fumitaka Kondo, Kanagawa (JP)

(73) Assignee: Sony Corporation (JP)

( * ) Notice: Subject to any disclaimer, the term of this patent is extended or adjusted under 35 U.S.C. 154(b) by 124 days.

(21) Appl. No.: 13/759,192

(22) Filed: Feb. 5, 2013

(65) Prior Publication Data
US 2013/0217344 A1 Aug. 22, 2013

(30) Foreign Application Priority Data

Feb. 17, 2012 (JP) ................... 2012-032538

(51) Int. Cl.
H04B 1/44 (2006.01)
(52) U.S. Cl.
CPC ....................... H04B 1/44 (2013.01)
USPC .......................................................... 455/78
(58) Field of Classification Search
CPC ............. H04B 1/44; H04B 1/48; H04B 1/525
USPC .......................................................... 455/78
See application file for complete search history.

(56) References Cited

U.S. PATENT DOCUMENTS 6,600,931 B2 * 7/2003 Sutton et al. ............... 455/552.1
7,139,548 B2 * 11/2006 Hayashi et al. ............... 455/333
2003/0042944 A1 * 3/2003 Taguchi et al. ............... 327/112
2003/0058007 A1 * 3/2003 Taguchi et al. ............... 327/112
2003/0058008 A1 * 3/2003 Taguchi et al. ............... 327/112
2003/0071663 A1 * 4/2003 Taguchi et al. ............... 327/112
2004/0102176 A1 * 5/2004 Hayashi et al. ............... 455/333
2010/0069020 A1 * 3/2010 Koya et al. ..................... 455/78
2010/0178879 A1 * 7/2010 Sato et al. ....................... 455/78
2011/0285475 A1 * 11/2011 Lu et al. ........................ 333/104
2012/0064842 A1 * 3/2012 Ferchland et al. .............. 455/78
2012/0206886 A1 * 8/2012 Uejima ........................ 361/748

FOREIGN PATENT DOCUMENTS

JP 2002-335187 A 11/2002

* cited by examiner

Primary Examiner — April G Gonzales
(74) Attorney, Agent, or Firm — Lerner, David, Littenberg, Krumholz & Mentlik, LLP

(57) ABSTRACT

Provided is an integrated circuit including a first switch element provided on a transmission path, a second switch element provided on a reception path, a third switch element provided between an input-side node of the first switch element and a ground potential, and a fourth switch element provided between an output-side node of the second switch element and the ground potential. The second switch element and the third switch element are turned on when the first switch element and the fourth switch element are turned off. The second switch element and the third switch element are turned off when the first switch element and the fourth switch element are turned on. An output-side node of the first switch element is connected to an input-side node of the second switch element, and a size of the first switch element is smaller than a size of the second switch element.

7 Claims, 14 Drawing Sheets

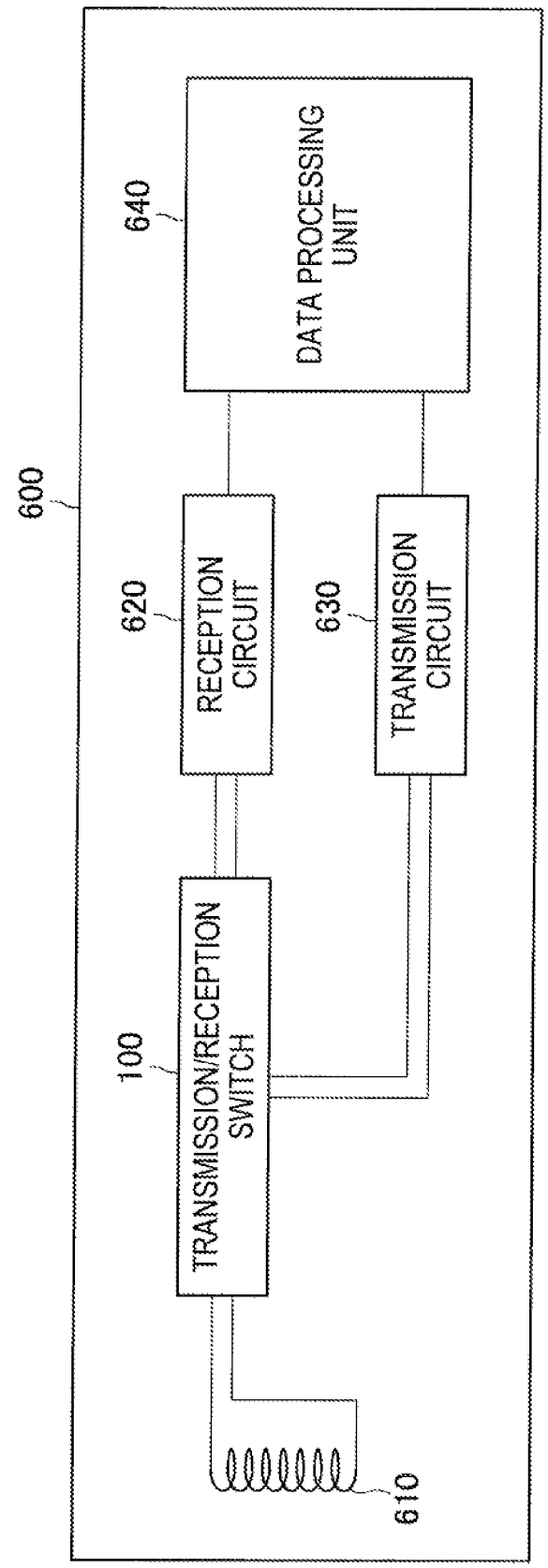

INTEGRATED CIRCUIT AND WIRELESS COMMUNICATION APPARATUS

CROSS-REFERENCE TO RELATED APPLICATION

The present application claims priority from Japanese Patent Application No. JP 2012-032538 filed in the Japanese Patent Office on Feb. 17, 2012, the entire content of which is incorporated herein by reference.

BACKGROUND

The present disclosure relates to an integrated circuit and a wireless communication apparatus.

In a transmission/reception switch to switch transmission and reception of a wireless apparatus, a metal-oxide-semiconductor field-effect transistor (MOSFET) has been generally used, when a manufacturing process is for a CMOS (for example, refer to Japanese Patent Application Laid-Open No. 2002-335187).

SUMMARY

In the wireless apparatus, because the transmission/reception switch is generally arranged at a front stage of a system, signal loss of the transmission/reception switch using the MOSFET affects reception sensitivity in a reception system and transmission power in a transmission system. Therefore, in the transmission/reception switch using the MOSFET, it is requested to realize low loss when the MOSFET is turned on and high isolation when the MOSFET is turned off.

In the existing transmission/reception switch using the MOSFET, an influence from a parasitic element of a turned-on signal path is decreased to realize the low loss when the MOSFET is turned on. However, in a transmission/reception switch for a high frequency signal, an influence from a parasitic element of a turned-off signal path may not be ignored. In a general system, switch loss of a signal path of a reception side affects reception sensitivity and switch loss of a signal path of a transmission side affects transmission power and consumption power. Therefore, when the low loss is realized, it is requested to decrease loss in both the transmission system and the reception system. However, there is a limitation in decreasing the loss.

It is desirable to provide an integrated circuit and a wireless communication apparatus that can realize low loss in a system in which it is necessary to decrease the loss and satisfy both the low loss and high isolation.

According to an embodiment of the present disclosure, there is provided an integrated circuit including a first switch element that is provided on a transmission path, a second switch element that is provided on a reception path, a third switch element that is provided between an input-side node of the first switch element and a ground potential, and a fourth switch element that is provided between an output-side node of the second switch element and the ground potential. The second switch element and the third switch element are turned on when the first switch element and the fourth switch element are turned off. The second switch element and the third switch element are turned off when the first switch element and the fourth switch element are turned on. An output-side node of the first switch element is connected to an input-side node of the second switch element, and a size of the first switch element is smaller than a size of the second switch element.

Further, according to an embodiment of the present disclosure, there is provided a wireless communication apparatus including a first switch element that is provided on a transmission path, a second switch element that is provided on a reception path, a third switch element that is provided between an input-side node of the first switch element and a ground potential, a fourth switch element that is provided between an output-side node of the second switch element and the ground potential, and an antenna that is connected to a node between an output-side node of the first switch element and an input-side node of the second switch element. When a signal is received from the antenna, and the first switch element and the fourth switch element are turned off, the second switch element and the third switch element are turned on. When a signal is transmitted from the antenna, and the first switch element and the fourth switch element are turned on, the second switch element and the third switch element are turned off. A size of the first switch element is smaller than a size of the second switch element.

According to the embodiments of the present disclosure described above, an integrated circuit and a wireless communication apparatus that can realize low loss in a system in which it is necessary to decrease the loss and satisfy both the low loss and high isolation can be provided.

BRIEF DESCRIPTION OF THE DRAWINGS

FIG. 16 is a diagram illustrating a configuration of a wireless communication apparatus 600 including a transmission/reception switch according to each embodiment of the present disclosure.

DETAILED DESCRIPTION OF THE EMBODIMENT(S)

Figure 1:
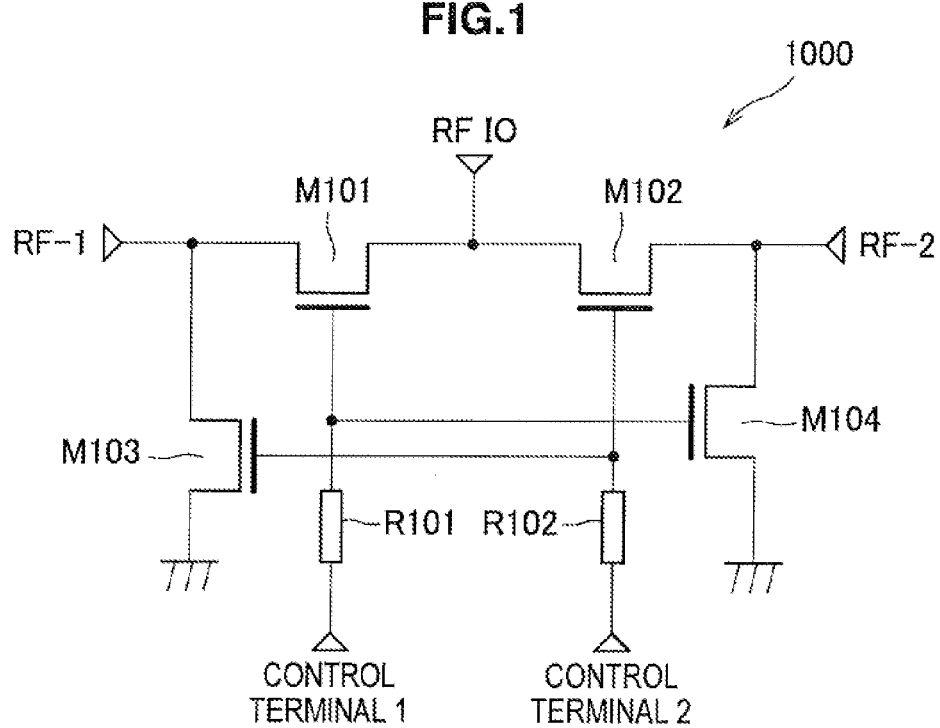
FIG. 1 is a diagram illustrating a configuration example of a transmission/reception switch using a MOSFET according to the related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

<1. Related Art and Problem thereof>
<2. First Embodiment>
<3. Second Embodiment>
<4. Third Embodiment>
<5. Fourth Embodiment>
<6. Fifth Embodiment>
<7. Wireless Communication Apparatus including Transmission/Reception Switch>
<8. Summary>

<1. Related Art and Problem Thereof>

First, technology for realizing low loss when a MOSFET is turned on and high isolation when the MOSFET is turned off in a transmission/reception switch using an existing MOSFET and a problem thereof will be described.

FIG. 1 is a diagram illustrating a configuration example of a transmission/reception switch using a MOSFET according to the related art. In a transmission/reception switch 1000 illustrated in FIG. 1, four MOSFETs M101 to M104 are used. Each of the MOSFETs M101 to M104 is an n-type MOSFET. An RF-1 is an interface that is connected to a transmission-side system, an RF-2 is an interface that is connected to a reception-side system, and an RF IO is an interface that is connected to an antenna. The MOSFETs M101 and M102 have functions of switches to turn on/off a transmission system and a reception system, respectively, and the MOSFETs M103 and M104 have functions of switches to connect the transmission system and the reception system to a ground and realize isolation, respectively.

The MOSFETs M101 and M104 are turned on/off at the same timing by a control terminal 1 and the MOSFETs M102 and M103 are turned on/off at the same timing by a control terminal 2. When the MOSFETs M101 and M104 are turned on, the MOSFETs M102 and M103 are turned off and when the MOSFETs M101 and M104 are turned off, the MOSFETs M102 and M103 are turned on.

At the time of transmission, the MOSFETs M101 and M104 are turned on and the MOSFETs M102 and M103 are turned off. As a result, a signal is transmitted from the antenna connected to the RF IO and an unnecessary wave of a reception system and impedance of a turned-off reception-system circuit can be prevented from affecting the RF IO. At the time of reception, the MOSFETs M102 and M103 are turned on and the MOSFETs M101 and M103 are turned off. As a result, a signal that is received by the antenna connected to the RF IO is transmitted to the reception system and an unnecessary wave of a transmission system and impedance of a turned-off transmission-system circuit can be prevented from affecting the RF IO.

As such, in a wireless apparatus, because the transmission/reception switch is generally arranged at a front stage of a system, signal loss of the transmission/reception switch using the MOSFET affects reception sensitivity in the reception system and transmission power in the transmission system. Therefore, in the transmission/reception switch using the MOSFET, it is requested to realize low loss when the MOSFET is turned on and high isolation when the MOSFET is turned off.

As methods of realizing low loss when the MOSFET is turned on, a method of increasing a size of the MOSFET to decrease ON resistance of the MOSFET for the switch on a signal path, technology for removing a ground MOSFET for isolation to decrease a parasitic capacity, and technology using an inductor and a capacitor are known.

Figure 2:
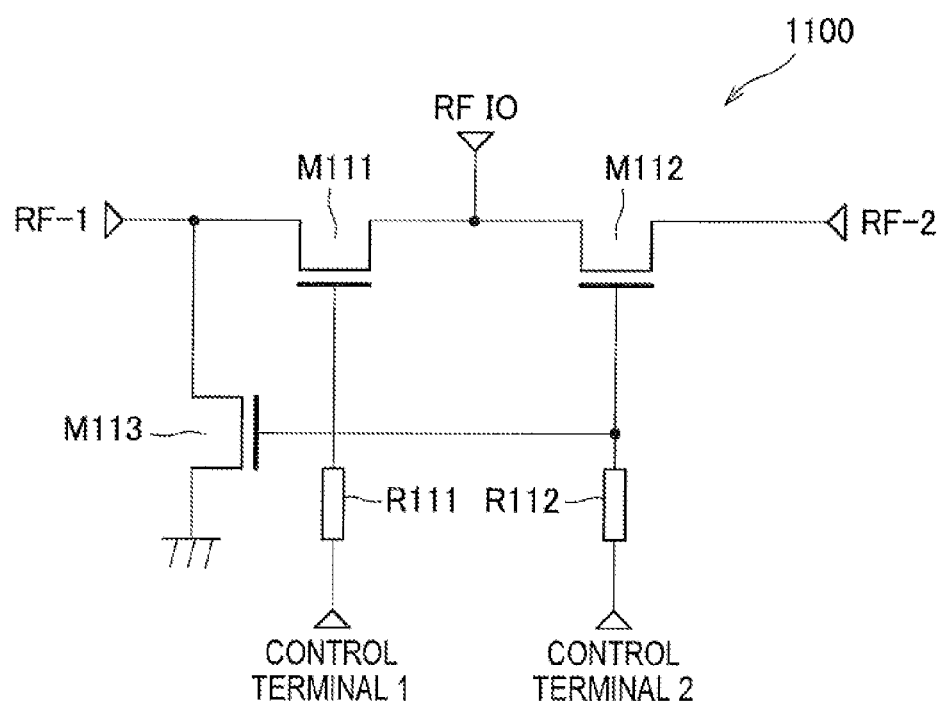
FIG. 2 is a diagram illustrating a configuration example of a transmission/reception switch using a MOSFET according to the related art.

FIG. 2 is a diagram illustrating a configuration example of a transmission/reception switch using a MOSFET according to the related art. In a transmission/reception switch 1100 illustrated in FIG. 2, three MOSFETs M111 to M113 are used. Functions of an RF-1, an RF-2, and an RF IO are the same as those in the transmission/reception switch 1000 illustrated in FIG. 1.

In the transmission/reception switch 1100 illustrated in FIG. 2, a ground MOSFET M113 for isolation is provided in only a transmission-side system. Because one ground MOSFET for isolation is removed from the configuration of the transmission/reception switch 1000 illustrated in FIG. 1, a parasitic capacity decreases. However, the isolation may be deteriorated due to the removal of the ground MOSFET.

Figure 3:
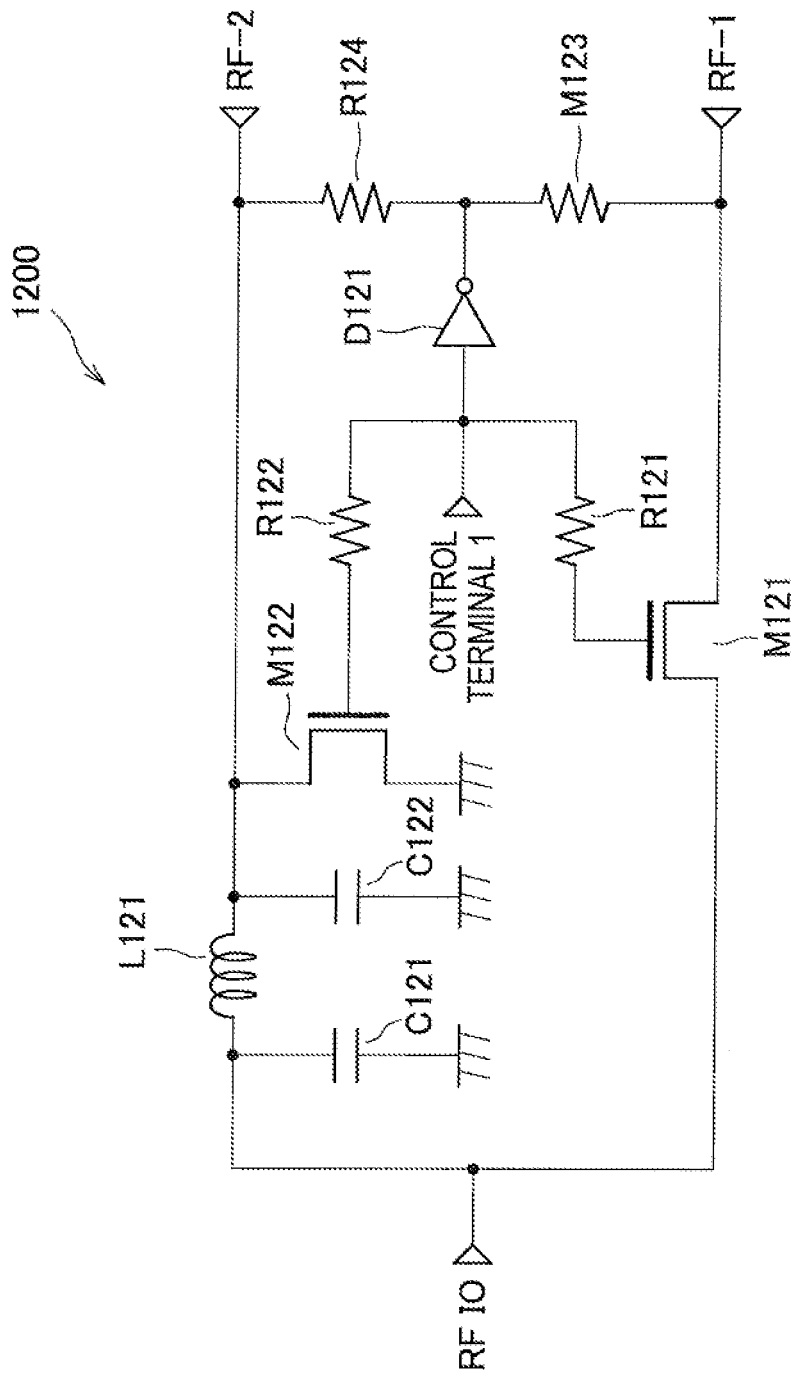
FIG. 3 is a diagram illustrating a configuration example of a transmission/reception switch according to the related art.

FIG. 3 is a diagram illustrating a configuration example of a transmission/reception switch according to the related art. In a transmission/reception switch 1200 illustrated in FIG. 3, two MOSFETs M121 and M122, an inductor L121, and capacitors C121 and C122 are used. Functions of an RF-1, an RF-2, and an RF IO are the same as those in the transmission/reception switch 1000 illustrated in FIG. 1.

In the transmission/reception switch 1200 illustrated in FIG. 3, because the inductor L121 and the capacitors C121 and C122 are provided in a reception system and a MOSFET is not provided on a reception path, loss can be decreased. However, in the transmission/reception switch 1200 illustrated in FIG. 3, because the inductor is provided, a size may increase as compared with the case in which the MOSFET is provided.

When a signal is transmitted and received using short-distance wireless transmission technology using a weak electric wave, it is necessary to suppress transmission power. For this reason, even if the loss of the transmission side increases to some extent, an influence thereof is small. Meanwhile, because it is necessary to improve reception sensitivity in the reception side, it is preferable to minimize the loss.

Therefore, in each embodiment of the present disclosure to be described below, a transmission/reception switch in which the loss of the reception side is minimized while the loss of the transmission side is sacrificed to some extent, thereby improving performance and a wireless transmission apparatus using the transmission/reception switch will be described.

<2. First Embodiment>

Figure 4:
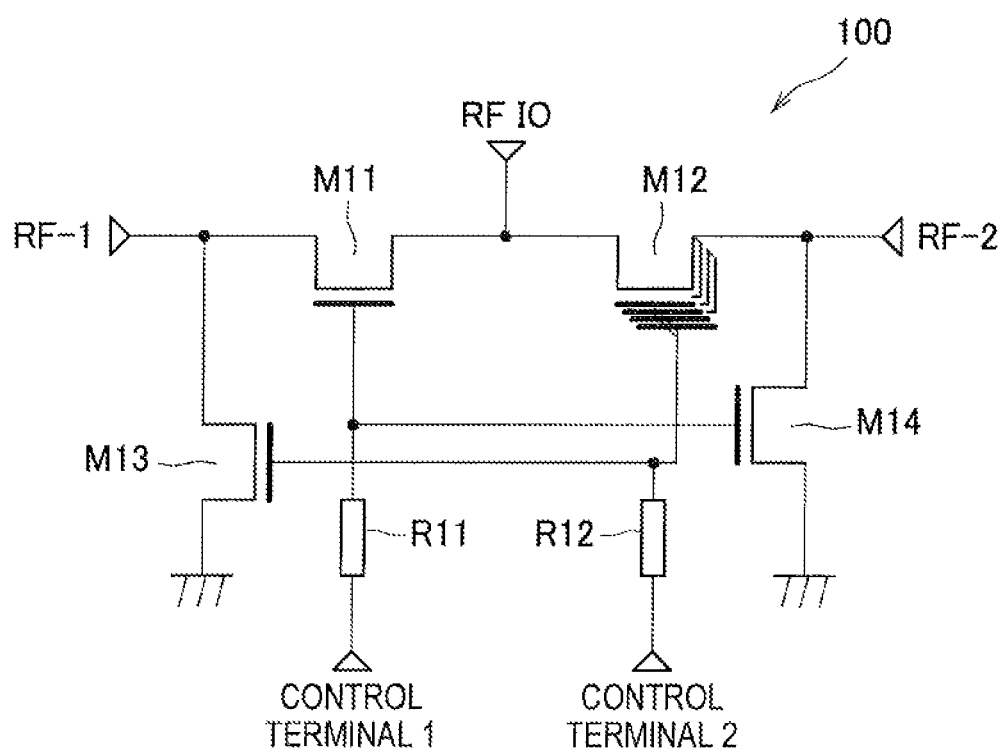
FIG. 4 is a diagram illustrating a configuration of a transmission/reception switch 100 according to a first embodiment of the present disclosure.

FIG. 4 is a diagram illustrating a configuration of a transmission/reception switch 100 according to a first embodiment of the present disclosure. Hereinafter, the configuration of the transmission/reception switch 100 according to the first embodiment of the present disclosure will be described using FIG. 4.

As illustrated in FIG. 4, the transmission/reception switch 100 according to the first embodiment of the present disclosure includes MOSFETs M11 to M14 that are n-type MOSFETs. An RF-1 is an interface that is connected to a transmission-side system, an RF-2 is an interface that is connected to a reception-side system, and an RF IO is an interface that is connected to an antenna. The MOSFETs M11 and M12 have functions of switches to turn on/off a transmission system and a reception system, respectively, and the MOSFETs M13 and M14 have functions of switches to connect the transmission system and the reception system to a ground and realize isolation, respectively.

The MOSFETs M11 and M14 are turned on/off at the same timing by a control terminal 1 and the MOSFETs M12 and M13 are turned on/off at the same timing by a control terminal 2. When the MOSFETs M11 and M14 are turned on, the MOSFETs M12 and M13 are turned off and when the MOSFETs M11 and M14 are turned off, the MOSFETs M12 and M13 are turned on.

At the time of transmission, the MOSFETs M11 and M14 are turned on and the MOSFETs M12 and M13 are turned off. As a result, a signal is transmitted from the antenna connected to the RF IO and a transmission signal is prevented from being transmitted to the reception system. At the time of reception, the MOSFETs M12 and M13 are turned on and the MOSFETs M11 and M13 are turned off. As a result, a signal that is received by the antenna connected to the RF IO is transmitted to the reception system and the received signal is prevented from being transmitted to the transmission system.

In the transmission/reception switch 100 according to this embodiment, a size of the MOSFET M11 is smaller than a size of the MOSFET M12. If the size of the MOSFET M11 is smaller than the size of the MOSFET M12, a parasitic capacity of the MOSFET M11 from the RF IO can be decreased.

Figure 5:
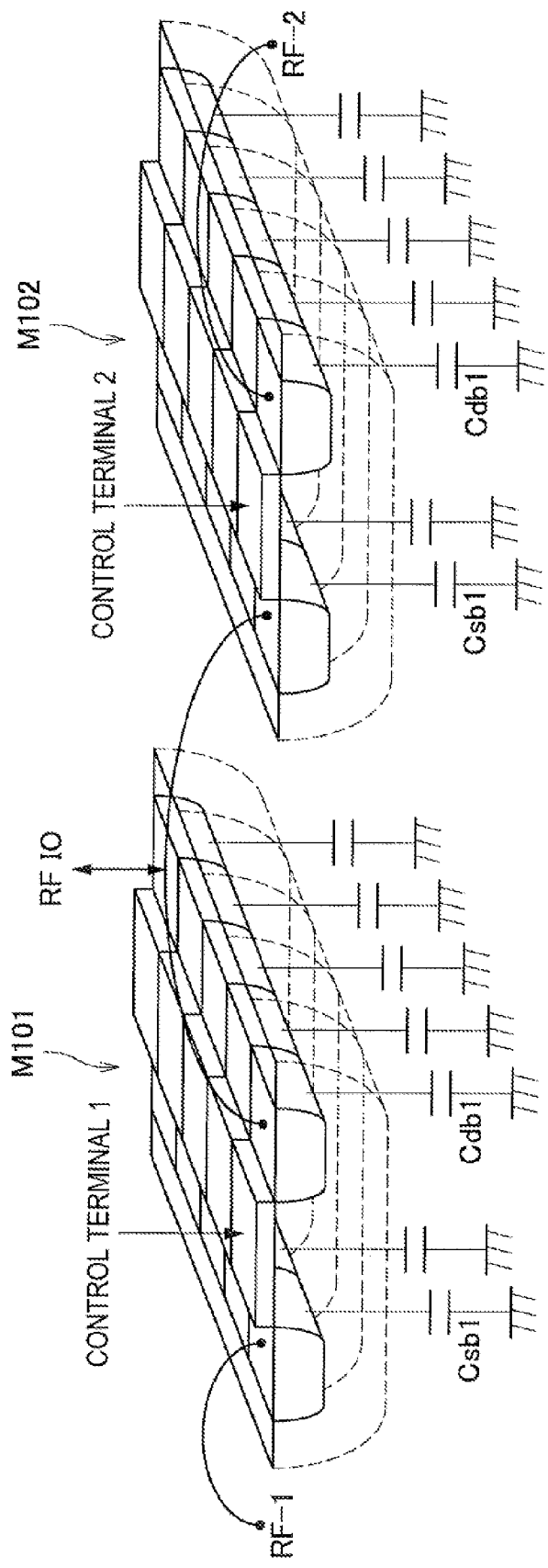
FIG. 5 is a diagram illustrating cross-sectional images of MOSFETs M101 and M102 that are provided in a transmission/reception switch 1000 according to the related art illustrated in FIG. 1.

FIG. 5 is a diagram illustrating cross-sectional images of the MOSFETs M101 and M102 that are provided in the transmission/reception switch 1000 according to the related art illustrated in FIG. 1. The MOSFETs M101 and M102 that are provided in the transmission/reception switch 1000 according to the related art have the same size, as illustrated in FIG. 5. In each of the MOSFETs M101 and M102, a parasitic capacity Csb1 between a source and a base and a parasitic capacity Cdb1 between a drain and the base exist.

Figure 6:
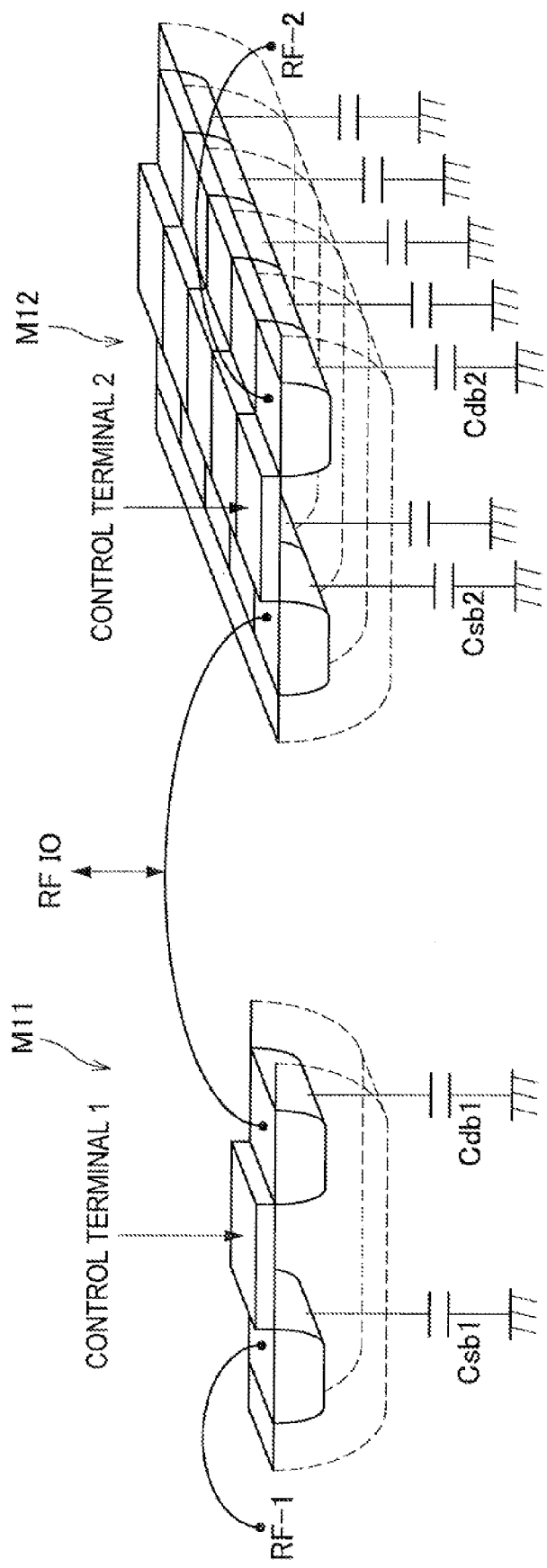
FIG. 6 is a diagram illustrating cross-sectional images of MOSFETs M11 and M12 that are provided in the transmission/reception switch 100 according to the first embodiment of the present disclosure illustrated in FIG. 4.

FIG. 6 is a diagram illustrating cross-sectional images of the MOSFETs M11 and M12 that are provided in the transmission/reception switch 100 according to the first embodiment of the present disclosure illustrated in FIG. 4. As illustrated in FIG. 6, in the MOSFETs M11 and M12 that are provided in the transmission/reception switch 100, a size of the MOSFET M11 that is provided on a transmission path becomes smaller than a size of the MOSFET M12 provided on a reception path. In the MOSFETs M11 and M12, parasitic capacities Csb1 and Csb2 between sources and bases and parasitic capacities Cdb1 and Cdb2 between drains and the bases exist, respectively.

In general, in the transmission/reception switch using the MOSFET, the MOSFET that performs switching to decrease ON resistance is provided to have a large size. However, the MOSFET M11 that is provided on the transmission path is provided to have a small size. If the size of the MOSFET M11 is decreased, loss of the transmission path increases. However, the parasitic capacities (the parasitic capacity Csb1 between the source and the base and the parasitic capacity Cdb1 between the drain and the base) of the MOSFET M11 from the RF IO decrease and loss of the reception path can be decreased.

As described above, in the transmission/reception switch 100 according to the first embodiment of the present disclosure, the size of the MOSFET M11 that is provided on the transmission path becomes smaller than the size of the MOSFET M12 provided on the reception path. As a result, the parasitic capacities (the parasitic capacity Csb1 between the source and the base and the parasitic capacity Cdb1 between the drain and the base) of the MOSFET M11 from the RF IO decrease and loss of the reception path can be decreased. Because the ground MOSFETs M13 and M14 for the isolation are provided in the both the transmission side and the reception side, the transmission/reception switch 100 according to the first embodiment of the present disclosure can meet a request for high isolation.

<3. Second Embodiment>

Figure 7:
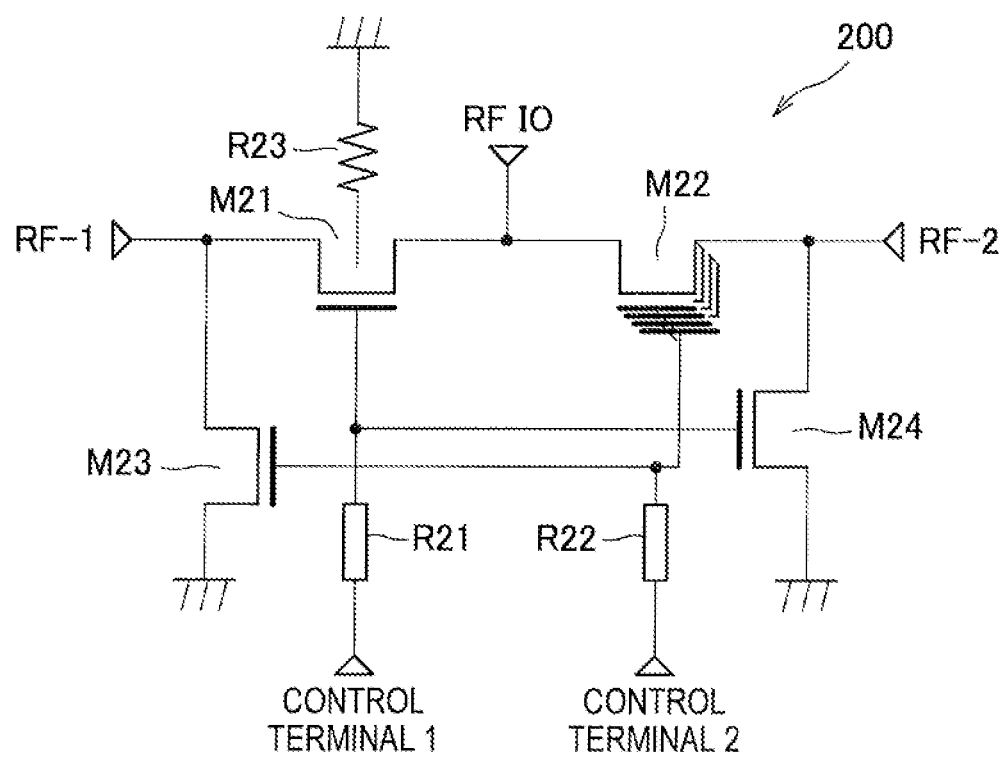
FIG. 7 is a diagram illustrating a configuration of a transmission/reception switch 200 according to a second embodiment of the present disclosure.

Next, a transmission/reception switch according to a second embodiment of the present disclosure will be described. FIG. 7 is a diagram illustrating a configuration of a transmission/reception switch 200 according to the second embodiment of the present disclosure. Hereinafter, the configuration of the transmission/reception switch 200 according to the second embodiment of the present disclosure will be described using FIG. 7.

As illustrated in FIG. 7, the transmission/reception switch 200 according to the second embodiment of the present disclosure includes MOSFETs M21 to M24. Functions of an RF-1, an RF-2, and an RF IO are the same as those of the transmission/reception switch 100 illustrated in FIG. 4.

The transmission/reception switch 200 according to the second embodiment of the present disclosure illustrated in FIG. 7 is different from the transmission/reception switch 100 according to the first embodiment of the present disclosure in that a well terminal of the MOSFET M21 provided on a transmission path is connected to a ground potential through a resistor R23 having high impedance.

Figure 8:
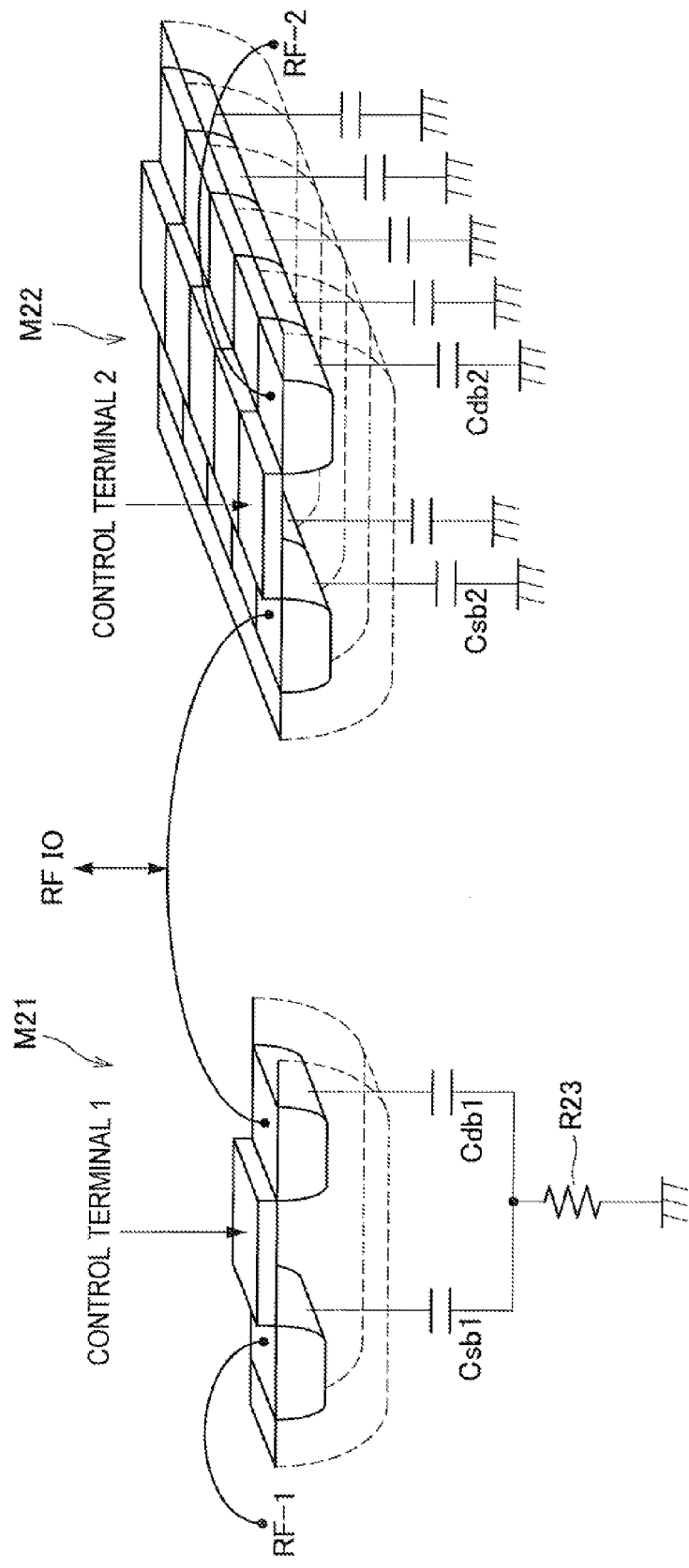
FIG. 8 is a diagram illustrating cross-sectional images of MOSFETs M21 and M22 that are provided in the transmission/reception switch 200 according to the second embodiment of the present disclosure illustrated in FIG. 7.

FIG. 8 is a diagram illustrating cross-sectional images of the MOSFETs M21 and M22 that are provided in the transmission/reception switch 200 according to the second embodiment of the present disclosure illustrated in FIG. 7. As illustrated in FIG. 8, in the MOSFETs M21 and M22 that are provided in the transmission/reception switch 200, a size of the MOSFET M21 that is provided on a transmission path becomes smaller than a size of the MOSFET M22 provided on a reception path. The well terminal of the MOSFET M21 is connected to the ground potential through the resistor R23 having the high impedance. Therefore, a parasitic capacity Csb1 between a source and a base of the MOSFET M21 and a parasitic capacity Cdb1 between a drain and the base of the MOSFET M21 are connected to the ground potential through the resistor R23 having the high impedance.

As such, the well terminal of the MOSFET M21 provided on the transmission path is connected to the ground potential through the resistor R23 having the high impedance, so that impedance from a drain terminal of the MOSFET M21, including a drain capacity of the MOSFET M21, can be increased. By increasing the impedance from the drain terminal of the MOSFET M21, the parasitic capacity of the MOSFET M21 from the RF IO can be decreased and the loss of the reception path can be decreased.

In FIGS. 7 and 8, the well terminal of the MOSFET M21 is connected to the ground potential through the resistor R23 having the high impedance. However, the present disclosure is not limited to the above example. For example, the well terminal of the MOSFET M21 may be floated on the transmission path and when a p-type MOSFET is provided on the transmission path, the well terminal of the MOSFET M21 may be connected to a power supply potential through the resistor R23 having the high impedance.

<4. Third Embodiment>

Figure 9:
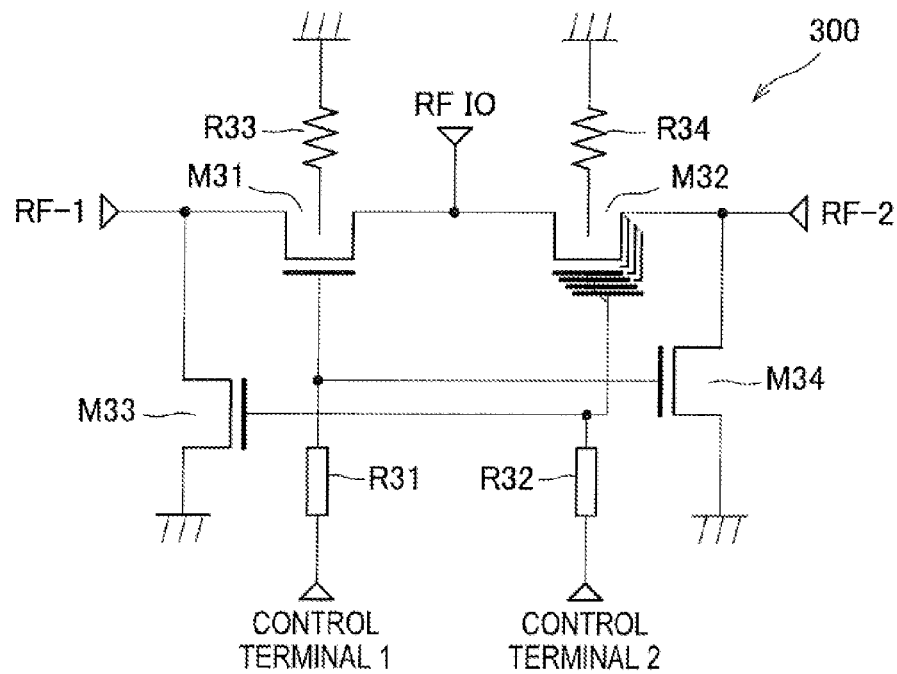
FIG. 9 is a diagram illustrating a configuration of a transmission/reception switch 300 according to a third embodiment of the present disclosure.

Next, a transmission/reception switch according to a third embodiment of the present disclosure will be described. FIG. 9 is a diagram illustrating a configuration of a transmission/reception switch 300 according to the third embodiment of the present disclosure. Hereinafter, the configuration of the transmission/reception switch 300 according to the third embodiment of the present disclosure will be described using FIG. 9.

As illustrated in FIG. 9, the transmission/reception switch 300 according to the third embodiment of the present disclosure includes MOSFETs M31 to M34. Functions of an RF-1, an RF-2, and an RF IO are the same as those of the transmission/reception switch 100 illustrated in FIG. 4.

The transmission/reception switch 300 according to the third embodiment of the present disclosure illustrated in FIG. 9 is different from the transmission/reception switch 200 according to the second embodiment of the present disclosure in that a well terminal of the MOSFET M32 provided on a reception path as well as a well terminal of the MOSFET M31 provided on a transmission path is connected to a ground potential through a resistor R34 having high impedance.

The well terminal of the MOSFET M31 provided on the transmission path is connected to the ground potential through a resistor R33 having high impedance, so that impedance from a drain terminal of the MOSFET M31, including a drain capacity of the MOSFET M31, can be increased. Similarly, the well terminal of the MOSFET M32 provided on the reception path is connected to the ground potential through the resistor R34 having the high impedance, so that impedance from a drain terminal of the MOSFET M32, including a drain capacity of the MOSFET M32, can be increased. Therefore, the parasitic capacities of the MOSFETs M31 and M32 from the RF IO can be decreased and the loss of the reception path can be decreased.

<5. Fourth Embodiment>

Figure 10:
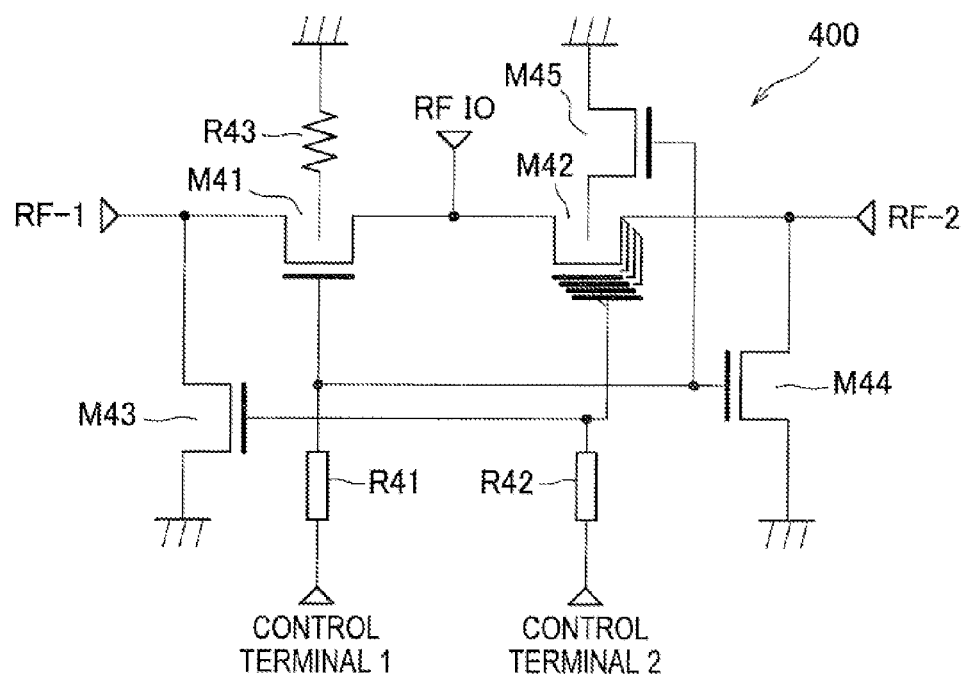
FIG. 10 is a diagram illustrating a configuration of a transmission/reception switch 400 according to a fourth embodiment of the present disclosure.

Next, a transmission/reception switch according to a fourth embodiment of the present disclosure will be described. FIG. 10 is a diagram illustrating a configuration of a transmission/reception switch 400 according to the fourth embodiment of the present disclosure. Hereinafter, the configuration of the transmission/reception switch 400 according to the fourth embodiment of the present disclosure will be described using FIG. 10.

As illustrated in FIG. 10, the transmission/reception switch 400 according to the fourth embodiment of the present disclosure includes MOSFETs M41 to M45. Functions of an RF-1, an RF-2, and an RF IO are the same as those of the transmission/reception switch 100 illustrated in FIG. 4.

The transmission/reception switch 400 according to the fourth embodiment of the present disclosure illustrated in FIG. 10 is different from the transmission/reception switch 200 according to the second embodiment of the present disclosure in that a well terminal of the MOSFET M42 provided on a reception path is connected to a ground potential through the MOSFET M45. ON/OFF of the MOSFET M45 is controlled by an application of a voltage from a control terminal 1. That is, when the MOSFETs M41 and M44 are turned on, the MOSFET M45 is also turned on. When the MOSFETs M41 and M44 are turned off, the MOSFET M45 is also turned off.

As described above, the well terminal of the MOSFET M42 used in the reception path is connected to a ground or a power supply through a resistor having high impedance, so that impedance from a drain terminal of the MOSFET M42, including a drain capacity of the MOSFET M42, can be increased. However, if only the above configuration is used, isolation when the MOSFET M42 is turned off may be deteriorated.

Therefore, in order to prevent the isolation when the MOSFET of the reception path is turned off from being deteriorated, the well terminal of the MOSFET M42 provided on the reception path is connected to the ground potential through the MOSFET M45, as illustrated in FIG. 10. The MOSFET M45 is inserted into a portion having high impedance to connect the well terminal of the MOSFET M42 provided on the reception path to the ground potential, and the MOSFET M45 is turned off when the reception path is turned on and the MOSFET M45 is turned on when the reception path is turned off.

Figure 11:
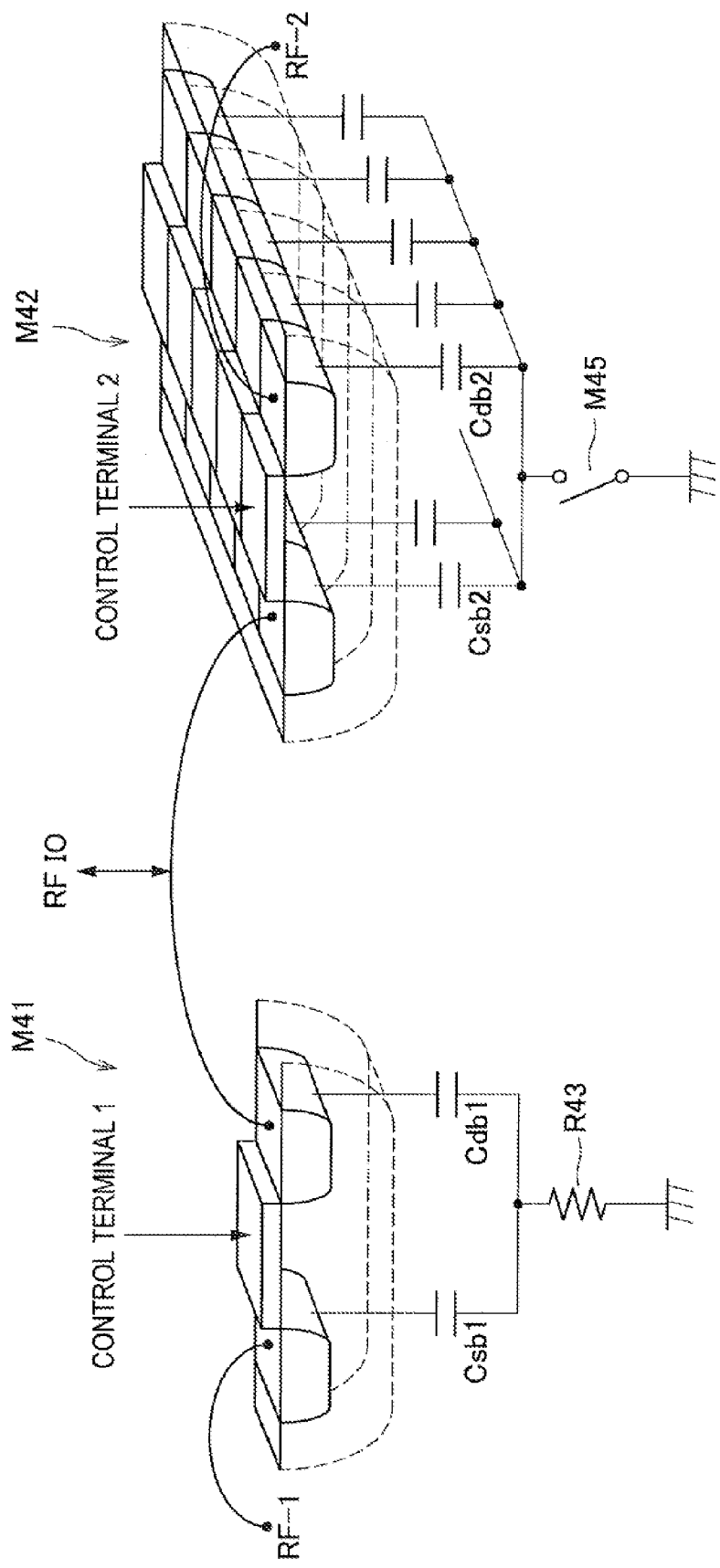
FIG. 11 is a diagram illustrating cross-sectional images of MOSFETs M41 and M42 that are provided in the transmission/reception switch 400 according to the fourth embodiment of the present disclosure illustrated in FIG. 10.

FIG. 11 is a diagram illustrating cross-sectional images of the MOSFETs M41 and M42 that are provided in the transmission/reception switch 400 according to the fourth embodiment of the present disclosure illustrated in FIG. 10. As illustrated in FIG. 11, in the MOSFETs M41 and M42 that are provided in the transmission/reception switch 400 according to the fourth embodiment of the present disclosure, a size of the MOSFET M41 that is provided on the transmission path becomes smaller than a size of the MOSFET M42 provided on the reception path. The well terminal of the MOSFET M41 is connected to the ground potential through the resistor R41 having the high impedance and the well terminal of the MOSFET M42 is connected to the ground potential through the MOSFET M45.

When the MOSFET M45 is turned off, the MOSFET M45 becomes have high impedance. For this reason, a parasitic capacity Csb2 between a source and a base and a parasitic capacity Cdb2 between a drain and the base are connected to the ground potential through the high impedance and impedance from a drain terminal of the MOSFET M42, including a drain capacity of the MOSFET M42, can be increased. When the MOSFET M42 is turned off, the MOSFET M45 is turned on. For this reason, the parasitic capacity Csb2 between the source and the base and the parasitic capacity Cdb2 between the drain and the base are connected to the ground potential and isolation from the reception path can be secured.

As such, the MOSFET M45 is inserted into the portion having the high impedance to connect the well terminal of the MOSFET M42 provided on the reception path to the ground potential. Thereby, the transmission/reception switch 400 according to the fourth embodiment of the present disclosure can decrease loss when the reception path is turned on and can secure the isolation from the reception path when the reception path is turned off and the transmission path is turned on.

<6. Fifth Embodiment>

Figure 12:
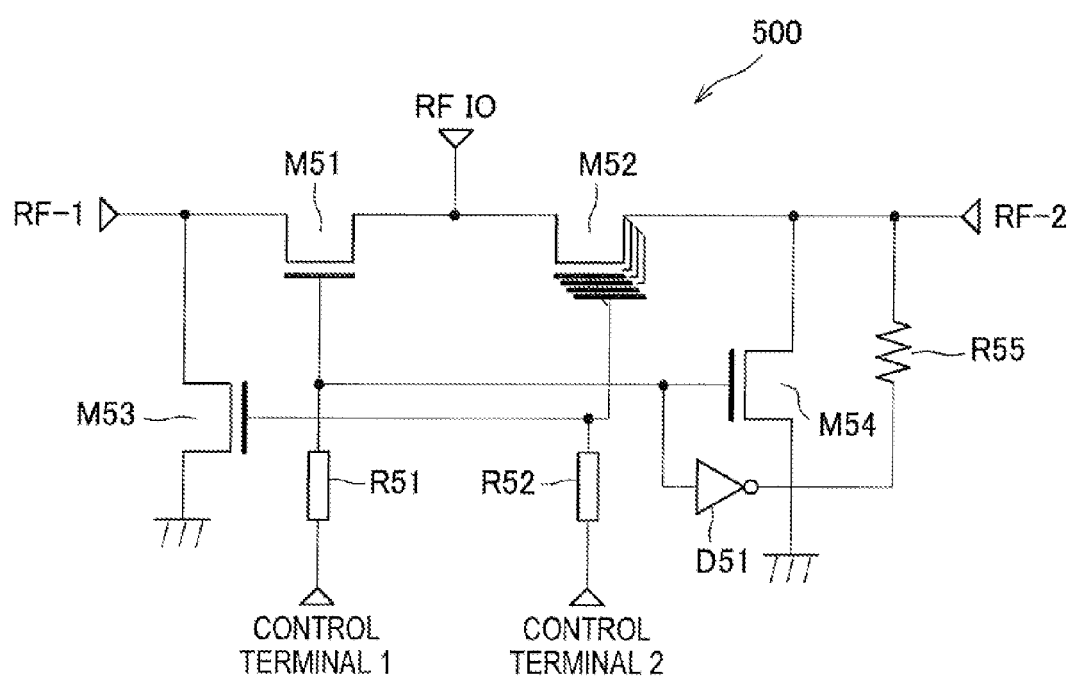
FIG. 12 is a diagram illustrating a configuration of a transmission/reception switch 500 according to a fifth embodiment of the present disclosure.

Next, a transmission/reception switch according to a fifth embodiment of the present disclosure will be described. FIG. 12 is a diagram illustrating a configuration of a transmission/reception switch 500 according to the fifth embodiment of the present disclosure. Hereinafter, the configuration of the transmission/reception switch 500 according to the fifth embodiment of the present disclosure will be described using FIG. 12.

As illustrated in FIG. 12, the transmission/reception switch 500 according to the fifth embodiment of the present disclosure includes MOSFETs M51 to M54. Functions of an RF-1, an RF-2, and an RF IO are the same as those of the transmission/reception switch 100 illustrated in FIG. 4. As illustrated in FIG. 12, in the transmission/reception switch 500 according to the fifth embodiment of the present disclosure, a gate terminal of the MOSFET M54 and the RF-2 are connected by a diode D51 and a resistor R55.

When the MOSFET M52 on a reception path in which it is requested to decrease loss is turned on, if a DC voltage is applied to the reception path, a reverse bias is applied to a P-N junction between a drain/source and a well in each of the MOSFET M52 on the reception path and the MOSFET M51 on the turned-off transmission path. When the MOSFET M52 on the reception path is turned on, a reverse bias is applied to both the MOSFET M52 on the turned-on reception path and the MOSFET M51 on the turned-off transmission path and parasitic capacities of both the MOSFETs M51 and M52 are decreased at the same time. By decreasing the parasitic capacities of both the MOSFETs M51 and M52 at the same time, loss of the reception path in which it is requested to decrease the loss can be decreased.

Figure 13:
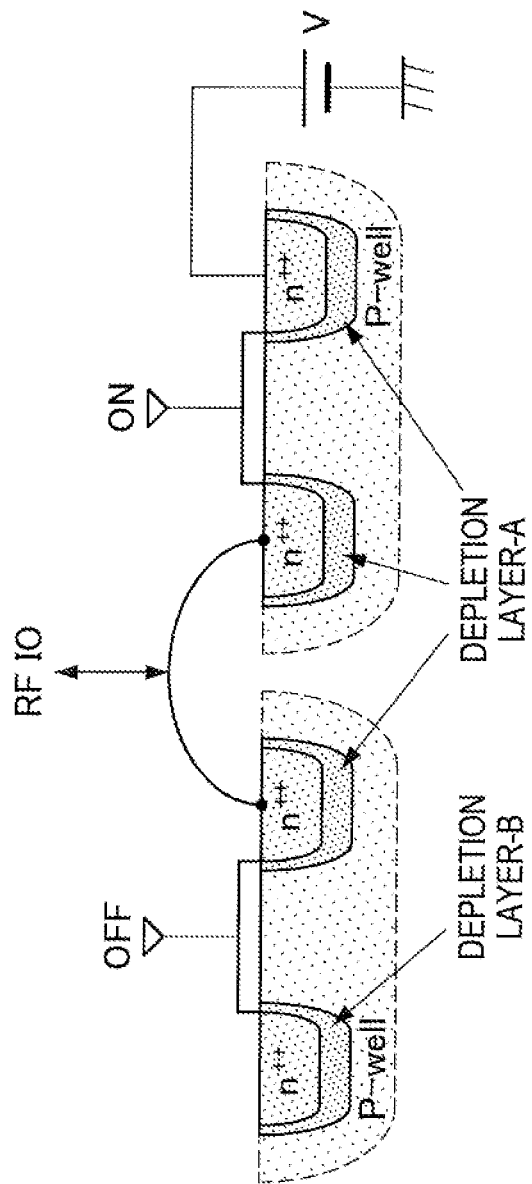
FIG. 13 is a diagram illustrating cross-sectional images of MOSFETs M51 and M52 that are provided in the transmission/reception switch 500 according to the fifth embodiment of the present disclosure illustrated in FIG. 12.
Figure 14:
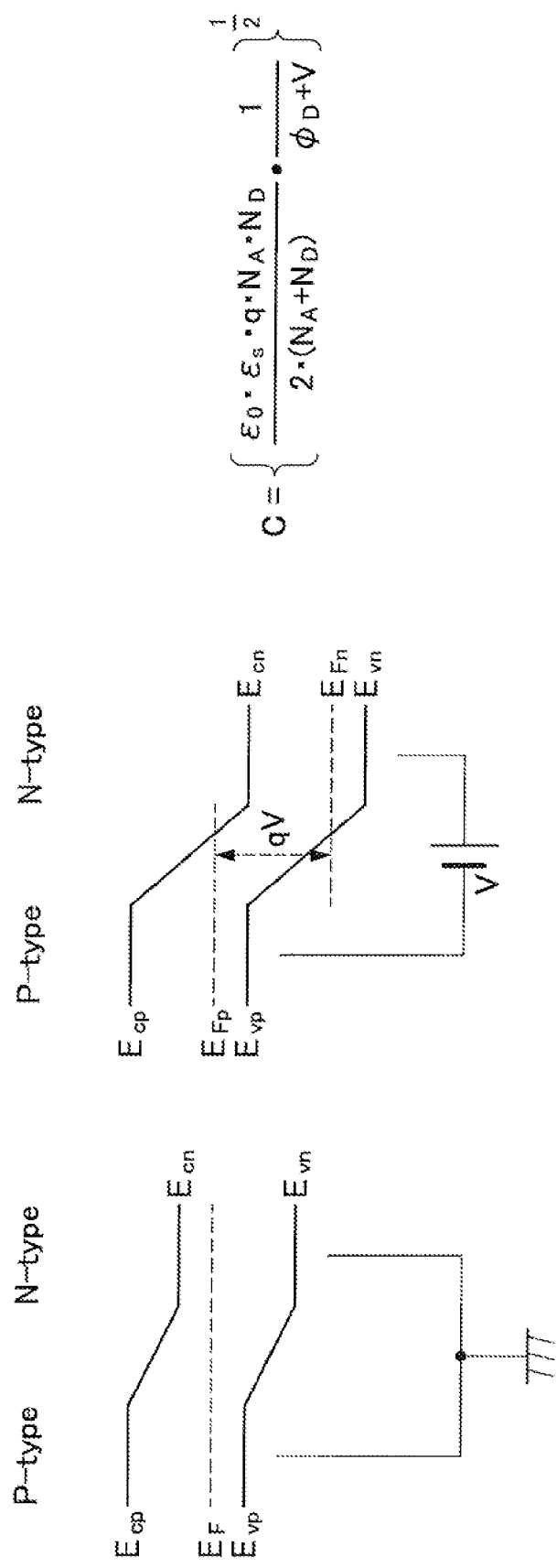
FIG. 14 is a diagram illustrating an aspect where parasitic capacities of the MOSFETs M51 and M52 decrease.

FIG. 13 is a diagram illustrating cross-sectional images of the MOSFETs M51 and M52 that are provided in the transmission/reception switch 500 according to the fifth embodiment of the present disclosure illustrated in FIG. 12. As illustrated in FIG. 13, the transmission/reception switch 500 according to the fifth embodiment of the present disclosure applies a DC voltage V to the reception path, when the MOSFET M52 on the reception path is turned on. If the DC voltage V is applied to the reception path, the reverse bias is applied to the P-N junction between the drain/source and the well in each of the MOSFETs M51 and M52 and the parasitic capacities of the MOSFETs M51 and M52 decrease. Specifically, if the DC voltage V is applied to the reception path, a source/drain depletion layer capacity of the MOSFET M52 decreases and a drain depletion layer capacity of the MOSFET M51 decreases. FIG. 14 is a diagram illustrating an aspect where the reverse bias is applied to the PN junction between the drain/source and the well and the parasitic capacities of the MOSFETs M51 and M52 decrease.

The reverse bias is applied to the PN junction between the drain/source and the well in each of the MOSFETs M51 and M52 to decrease the parasitic capacities of the MOSFETs M51 and M52. As a result, the transmission/reception switch 500 according to the fifth embodiment of the present disclosure can decrease the loss of the reception path in which it is requested to decrease the loss.

In the fifth embodiment of the present disclosure, the gate terminal of the MOSFET M14 and the RF-2 in the transmission/reception switch 100 illustrated in FIG. 4 are connected by the diode and the resistor. However, the present disclosure is not limited to the above example. Even in the transmission/reception switches 200, 300, and 400 described above, the gate terminal of the MOSFET provided on the reception path and the RF-2 may be connected by the diode and the resistor. The gate terminal of the MOSFET and the RF-2 are connected by the diode and the resistor to decrease the parasitic capacities of the MOSFET on the transmission path and the MOSFET on the reception path, thereby decreasing the loss of the reception path in which it is requested to decrease the loss.

Figure 15:
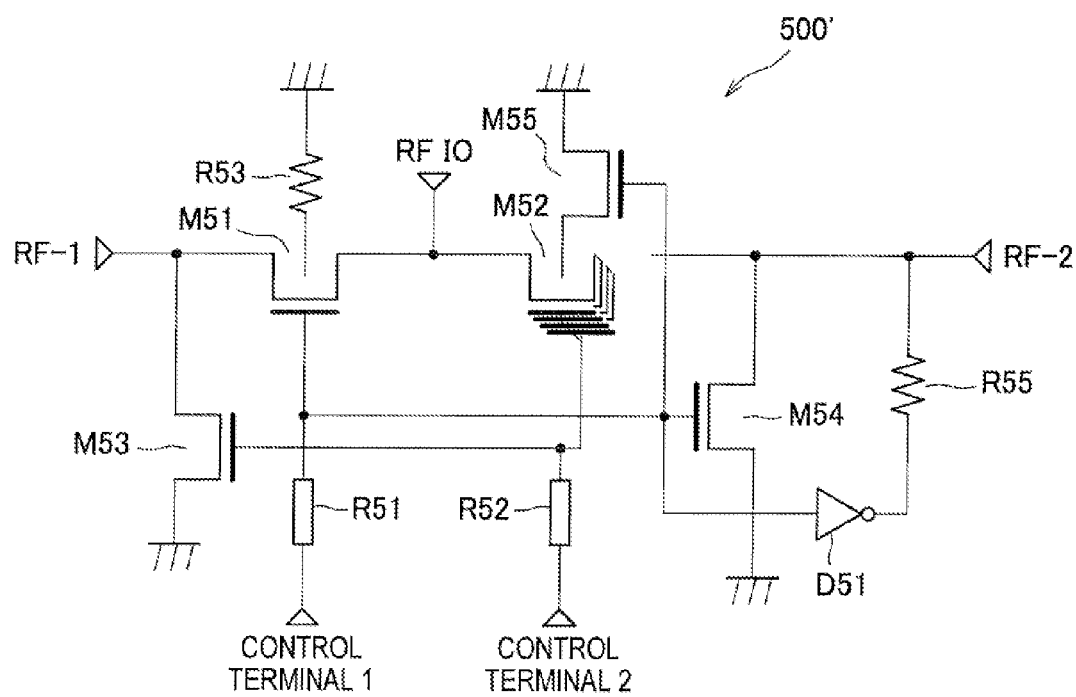
FIG. 15 is a diagram illustrating a configuration of a transmission/reception switch 500' according to a modification of the fifth embodiment of the present disclosure.

FIG. 15 is a diagram illustrating a circuit configuration of a transmission/reception switch 500' according to a modification of the fifth embodiment of the present disclosure. The transmission/reception switch 500' according to the modification is obtained by adding the inverter circuit D51 and the resistor R55 included in the transmission/reception switch 500 according to the fifth embodiment of the present disclosure illustrated in FIG. 12 to the transmission/reception switch 400 according to the fourth embodiment of the present disclosure illustrated in FIG. 10. As such, the gate terminal of the MOSFET M44 and the RF-2 in the transmission/reception switch 400 according to the fourth embodiment of the present disclosure illustrated in FIG. 10 are connected by the inverter circuit and the resistor to decrease the parasitic capacities of the MOSFET on the transmission path and the MOSFET on the reception path, thereby decreasing the loss of the reception path in which it is requested to decrease the loss.

<7. Wireless Communication Apparatus Including>Transmission/Reception Switch

Next, a wireless communication apparatus that includes the transmission/reception switch according to each embodiment of the present disclosure described above will be described. FIG. 16 is a diagram illustrating a configuration of a wireless communication apparatus 600 including a transmission/reception switch according to each embodiment of the present disclosure. Hereinafter, the configuration of the wireless communication apparatus 600 that includes the transmission/reception switch according to each embodiment of the present disclosure will be described using FIG. 16.

As illustrated in FIG. 16, the wireless communication apparatus 600 includes a transmission/reception switch 100, an antenna 610, a reception circuit 620, a transmission circuit 630, and a data processing unit 640. FIG. 16 illustrates the wireless communication apparatus 600 including the transmission/reception switch 100 according to the first embodiment of the present disclosure as an example. In the present disclosure, the transmission/reception switch according to one of the other embodiments may be provided in the wireless communication apparatus.

The wireless communication apparatus 600 illustrated in FIG. 16 is a wireless communication apparatus that is configured to perform high-speed proximity communication with a carrier of 4.48 GHz and at a communication speed of a maximum of 560 Mbps. The antenna 610 is an antenna that transmits and receives an electric wave by the high-speed proximity communication.

The reception circuit 620 is a circuit that generates reception data from the electric wave received by the antenna 610. The reception data that is generated by the reception circuit 620 is transmitted to the data processing unit 640. The transmission circuit 630 is a circuit that executes processing for transmitting transmission data transmitted from the data processing unit 640 by the antenna 610. The data processing unit 640 executes processing based on the reception data generated from the electric wave received by the antenna 610 or processing for generating the transmission data to be transmitted by the antenna 610.

Because it is necessary to suppress transmission power in the high-speed proximity communication, even if the loss of the transmission side increases to some extent, an influence thereof is small. Meanwhile, because it is necessary to improve reception sensitivity in the reception side, it is preferable to minimize the loss. Therefore, the transmission/reception switch according to each embodiment of the present disclosure described above is provided in the wireless communication apparatus to perform the high-speed proximity communication, so that the loss of the reception side can be minimized and the reception sensitivity can be prevented from being deteriorated due to the loss of the reception side.

<8. Summary>

As described above, according to each embodiment of the present disclosure, the size of the MOSFET provided on the transmission path becomes smaller than the size of the MOSFET provided on the reception path, so that the parasitic capacity of the MOSFET on the transmission path to be measured from the side of the antenna decreases and the loss of the reception path can be decreased. Because the ground MOSFET for the isolation is provided in both the transmission side and the reception side, it is possible to meet a request for high isolation.

When the transmission/reception switch according to each embodiment of the present disclosure is used at the reception side, the loss of the reception path decreases and the reception sensitivity can be improved. When the transmission/reception switch according to each embodiment of the present disclosure is used at the transmission side, efficiency of transmission power can be improved, which results to contribute to decreasing consumption power. If the transmission/reception switch according to each embodiment of the present disclosure is used in the wireless communication apparatus, the isolation can be maintained securely as compared with the transmission/reception switch according to the related art. Because it is not necessary to use the inductor, the size of the transmission/reception switch can be decreased.

In the transmission/reception switch according to each embodiment, the gate of the MOSFET to turn on/off the communication path and the gate of the ground MOSFET for the isolation are connected to the same conducting wire. However, the present disclosure is not limited to the above example. For example, in the transmission/reception switch 100 according to the first embodiment, when the MOSFETs M11 and M14 can be turned on/off at the same timing and the MOSFETs M12 and M13 can be turned on/off at the same timing, the gates of the MOSFETs M11 and M14 may not be connected to the same conducting wire and the gates of the MOSFETs M12 and M13 may not be connected to the same conducting wire.

It should be understood by those skilled in the art that various modifications, combinations, sub-combinations and alterations may occur depending on design requirements and other factors insofar as they are in the scope of the appended claims or the equivalents thereof.

Additionally, the present technology may also be configured as below.

(1) An integrated circuit including:
a first switch element that is provided on a transmission path;
a second switch element that is provided on a reception path;
a third switch element that is provided between an input-side node of the first switch element and a ground potential; and
a fourth switch element that is provided between an output-side node of the second switch element and the ground potential,
wherein the second switch element and the third switch element are turned on when the first switch element and the fourth switch element are turned off,
wherein the second switch element and the third switch element are turned off when the first switch element and the fourth switch element are turned on, and
wherein an output-side node of the first switch element is connected to an input-side node of the second switch element, and a size of the first switch element is smaller than a size of the second switch element.

(2) The integrated circuit according to (1), further including:
a direct-current voltage applying unit that is provided between a gate terminal of the fourth switch element and the output-side node of the second switch element.

(3) The integrated circuit according to (1) or (2), further including:
a first resistor that is provided between a well of the first switch element and a predetermined potential.

(4) The integrated circuit according to (3), further including:
a fifth switch element that is provided between a well of the second switch element and the predetermined potential,
wherein the fifth switch element is turned off when the first switch element and the fourth switch element are turned off, and the fifth switch element is turned on when the first switch element and the fourth switch element are turned on.

(5) The integrated circuit according to (3) or (4), further including:
a direct-current voltage applying unit that is provided between a gate terminal of the fourth switch element and the output-side node of the second switch element.

(6) The integrated circuit according to any one of (3) to (5), further including:
a second resistor that is provided between a well of the second switch element and the predetermined potential.

(7) A wireless communication apparatus including:
a first switch element that is provided on a transmission path;
a second switch element that is provided on a reception path;
a third switch element that is provided between an input-side node of the first switch element and a ground potential;
a fourth switch element that is provided between an output-side node of the second switch element and the ground potential; and
an antenna that is connected to a node between an output-side node of the first switch element and an input-side node of the second switch element,
wherein, when a signal is received from the antenna, and the first switch element and the fourth switch element are turned off, the second switch element and the third switch element are turned on,
wherein, when a signal is transmitted from the antenna, and the first switch element and the fourth switch element are turned on, the second switch element and the third switch element are turned off, and
wherein a size of the first switch element is smaller than a size of the second switch element.

What is claimed is:
1. An integrated circuit comprising:
a first switch element that is provided on a transmission path;
a second switch element that is provided on a reception path;
a third switch element that is provided between an input-side node of the first switch element and a ground potential; and
a fourth switch element that is provided between an output-side node of the second switch element and the ground potential,
wherein the second switch element and the third switch element are turned on when the first switch element and the fourth switch element are turned off,
wherein the second switch element and the third switch element are turned off when the first switch element and the fourth switch element are turned on, and
wherein an output-side node of the first switch element is connected to an input-side node of the second switch element, and a size of the first switch element is smaller than a size of the second switch element.

2. The integrated circuit according to claim 1, further comprising:
a direct-current voltage applying unit that is provided between a gate terminal of the fourth switch element and the output-side node of the second switch element.

3. The integrated circuit according to claim 1, further comprising:
a first resistor that is provided between a well of the first switch element and a predetermined potential.

4. The integrated circuit according to claim 3, further comprising:
a fifth switch element that is provided between a well of the second switch element and the predetermined potential,
wherein the fifth switch element is turned off when the first switch element and the fourth switch element are turned off, and the fifth switch element is turned on when the first switch element and the fourth switch element are turned on.

5. The integrated circuit according to claim 3, further comprising:
a direct-current voltage applying unit that is provided between a gate terminal of the fourth switch element and the output-side node of the second switch element.

6. The integrated circuit according to claim 3, further comprising:
a second resistor that is provided between a well of the second switch element and the predetermined potential.

7. A wireless communication apparatus comprising:
a first switch element that is provided on a transmission path;
a second switch element that is provided on a reception path;
a third switch element that is provided between an input-side node of the first switch element and a ground potential;
a fourth switch element that is provided between an output-side node of the second switch element and the ground potential; and
an antenna that is connected to a node between an output-side node of the first switch element and an input-side node of the second switch element,
wherein, when a signal is received from the antenna, and the first switch element and the fourth switch element are turned off, the second switch element and the third switch element are turned on,
wherein, when a signal is transmitted from the antenna, and the first switch element and the fourth switch element are turned on, the second switch element and the third switch element are turned off, and
wherein a size of the first switch element is smaller than a size of the second switch element.

* * * * *